United States Patent
Chou et al.

(10) Patent No.: US 7,641,360 B2
(45) Date of Patent: Jan. 5, 2010

(54) LIGHT-EMITTING UNIT AND BACKLIGHT MODULE

(75) Inventors: Shen-Hong Chou, Miaoli County (TW); Hsin-Wu Lin, Hsinchu County (TW); Chih-Kuang Chen, Kaohsiung (TW); Ci-Guang Peng, Chiayi (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 11/463,035

(22) Filed: Aug. 8, 2006

(65) Prior Publication Data
US 2008/0007938 A1    Jan. 10, 2008

(30) Foreign Application Priority Data
Jul. 4, 2006 (TW) .............................. 95124297 A

(51) Int. Cl.
*F21V 1/00* (2006.01)
(52) U.S. Cl. .......................... 362/235; 349/68; 349/66; 349/69; 362/84; 362/97; 362/612; 362/613; 362/545; 362/249; 257/88; 257/89; 257/98; 257/99; 313/500
(58) Field of Classification Search ........................ None
See application file for complete search history.

(56) References Cited

U.S. PATENT DOCUMENTS

| | | | | |
|---|---|---|---|---|
| 4,271,408 A | * | 6/1981 | Teshima et al. ................ 345/83 |
| 4,742,432 A | * | 5/1988 | Thillays et al. .............. 361/783 |
| 5,217,286 A | * | 6/1993 | Ming-ho ...................... 362/612 |
| 5,453,855 A | * | 9/1995 | Nakamura et al. ............. 349/58 |
| 5,567,036 A | * | 10/1996 | Theobald et al. ............. 362/485 |
| 5,694,287 A | * | 12/1997 | Nishiyama et al. ........... 361/525 |
| 5,924,788 A | * | 7/1999 | Parkyn, Jr. .................... 362/329 |
| 6,036,335 A | * | 3/2000 | Openiano .................... 362/241 |
| 6,433,483 B1 | * | 8/2002 | Michael et al. ................ 315/76 |
| 6,623,151 B2 | * | 9/2003 | Pederson ..................... 362/542 |
| 7,040,792 B2 | * | 5/2006 | Brandenburg et al. ....... 362/545 |
| 2004/0218388 A1 | | 11/2004 | Suzuki |

FOREIGN PATENT DOCUMENTS

JP        2004172577        6/2004

OTHER PUBLICATIONS

"Polygon—Definitions from Dictionary.com" Retrived Jul. 6, 2007. Dictionary.com Unabridged (v 1.1). Random House, Inc. Jul. 6, 2007(http://dictionary.reference.com/browse/polygon).*
China Office Action mailed Aug. 10, 2007.
CN office action mailed Mar. 14, 2008.

* cited by examiner

*Primary Examiner*—Sandra L O'Shea
*Assistant Examiner*—Danielle Allen
(74) *Attorney, Agent, or Firm*—Thomas, Kayden, Horstemeyer & Risley

(57) ABSTRACT

A light-emitting unit includes a bounding frame, a first light-emitting element, a second light-emitting element, and a first reflecting sheet. The first light-emitting element and the second light-emitting element are disposed in the bounding frame, and emit light in different directions. The first reflecting sheet is disposed on the bounding frame, and has a reflecting surface on one side away from the bounding frame.

21 Claims, 4 Drawing Sheets

LIGHT-EMITTING UNIT AND BACKLIGHT MODULE

BACKGROUND OF THE INVENTION

1. Field of the Invention

The invention relates to a backlight unit and, in particular, to a light emitting diode (LED) backlight module.

2. Description of the Related Art

A liquid crystal display comprises a liquid crystal panel and a backlight unit. The liquid crystal panel comprises a thin layer of liquid crystal encased between upper and lower thin glass plates. An array of thin film transistors is disposed on the lower glass plate. The thin film transistors control liquid crystal passage of different brightness of emitted light. The backlight unit provides a light source.

FIG. 1 is a lateral view of a conventional LED backlight module. The light source is provided by light emitting diodes (LEDs). The LED backlight units LED1~LED4 are set on the substrate 101. Light guide plate and other optical plates are set above the light source to improve luminescent efficiency. FIG. 2 is a top view of a conventional LED backlight module. The LED unit comprises red, green, and blue light emitting diodes. There is the same distance P between each LED unit. To maintain uniform brightness, the distance P between the LED units cannot be increased with brightness of the light emitting diodes. Thus, the amount of the light emitting diodes and cost cannot be decreased.

BRIEF SUMMARY OF INVENTION

A light-emitting unit is provided. An exemplary embodiment of a light-emitting unit comprises a bounding frame, a first light-emitting element, and a second light-emitting element, wherein the first light-emitting element and the second light-emitting element are set in the bounding frame, and emit light in different directions. A first reflecting sheet is set on the bounding frame, and has a reflecting surface on one side.

Another exemplary embodiment of a backlight module comprises a bounding frame, a first light-emitting element, and a second light-emitting element, wherein the first light-emitting element and the second light-emitting element are set in the bounding frame, and emit light in different directions. A first reflecting sheet is set on the bounding frame, and has a reflecting surface on one side. A second reflecting sheet is set under the bounding frame, and has a second reflecting surface substantially facing upward.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
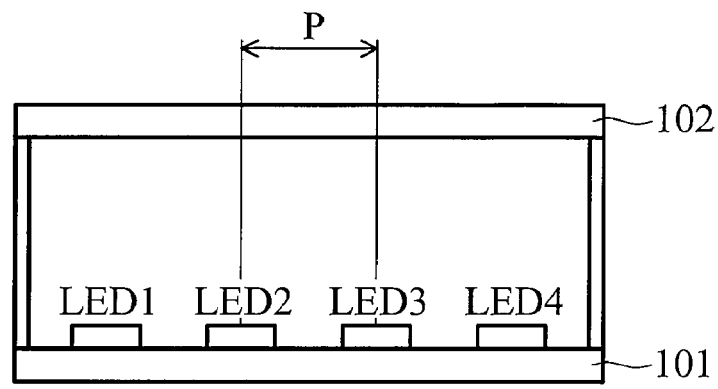
FIG. 1 is a lateral view of a conventional LED backlight module.
Figure 2:
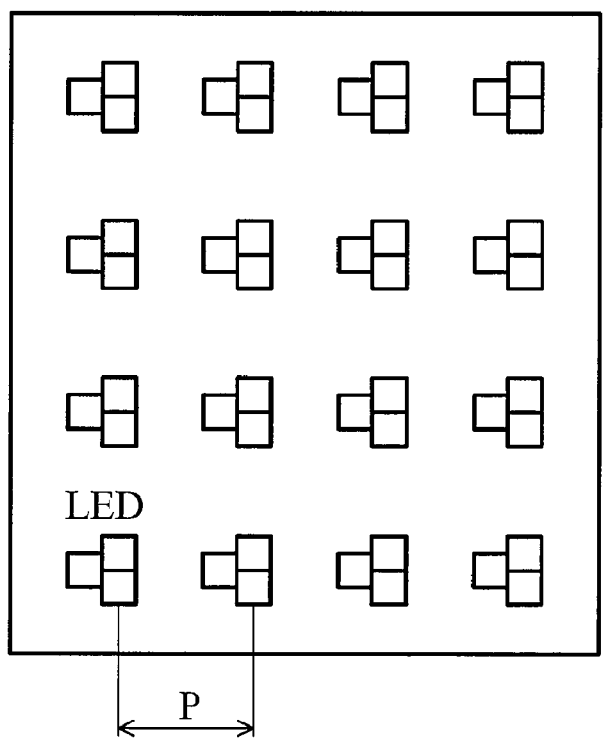
FIG. 2 is a top view of a conventional LED backlight module.
Figure 3:
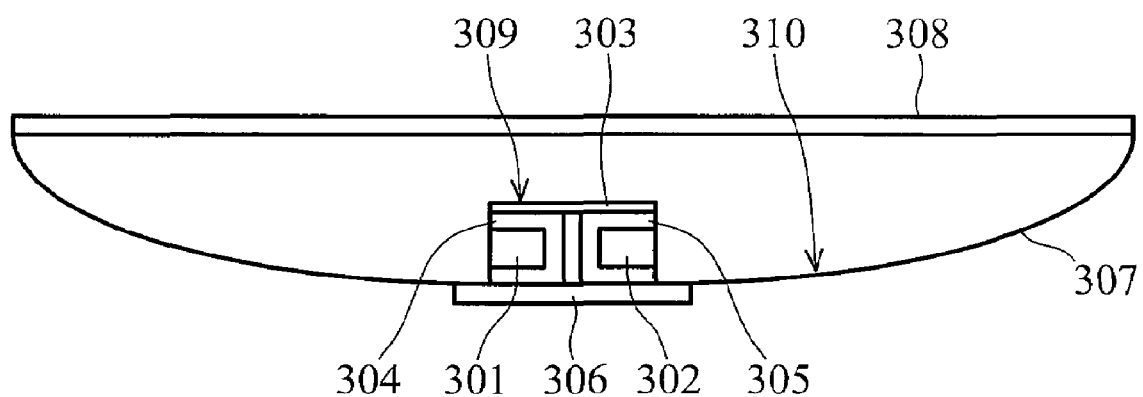
FIG. 3 is a lateral view of an LED backlight module of the invention.

FIG. 3 is a lateral view of an LED backlight module according to an embodiment of the invention. As shown in the FIG. 3, the LED backlight module comprises a first light-emitting element 301, a second light-emitting element 302, a first reflecting sheet 303, and a second reflecting sheet 307. The first light-emitting element 301 and the second light-emitting element 302 are disposed on the printed circuit sheet 306 and are electrically connected thereto. The first light-emitting element 301 and the second light-emitting element 302 are separately set in a first bounding frame 304 and a second bounding frame 305. The first light-emitting element 301 and the second light-emitting element 302 are also set in the same bounding frame.

A first reflecting sheet 303 is disposed on the bounding frame and has a reflecting surface 309 on a side away from the bounding frame, reflecting light to the top of the bounding frame. The second reflecting sheet 307 between the printed circuit sheet 306 and bounding frame has a second reflecting surface 310 on the top thereof and facing the bounding frame. The second reflecting surface 310 reflects light emitted from the light-emitting elements. The second reflecting sheet 307 can be curved or a polygon. The optical element 308 is on the top of the backlight module, emitting uniform light from the backlight module. The optical element 308 comprises a light guide plate and optical films, such as diffusion film, brightness enhancing film, or prism film.

Figure 4:
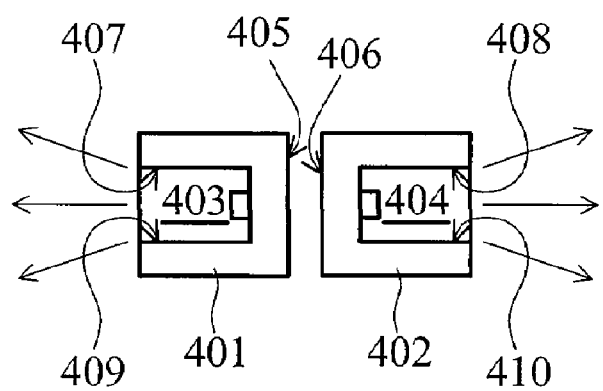
FIG. 4 shows one bounding frame of the invention.

FIG. 4 shows one bounding frame according to an embodiment of the invention. The first bounding frame 401 and the second bounding frame 402 respectively have emitting surfaces facing opposite directions. The other three surfaces of bounding frames 401 and 402 reflect light generated by first light-emitting element 403 and second light-emitting element 404 to the emitting surface of the LED backlight module. The light of the first light-emitting element 403 and the second light-emitting element 404 is separated by first blocking wall 405 and second blocking wall 406. The first bounding frame 401 and the second bounding frame 402 respectively have top reflecting surfaces 407 and 408, and bottom reflecting surfaces 409 and 410. Top reflecting surfaces 407 and 408 are set above light-emitting elements 403 and 404, and bottom reflecting surfaces 409 and 410 are set under light-emitting elements 403 and 404.

Figure 5:
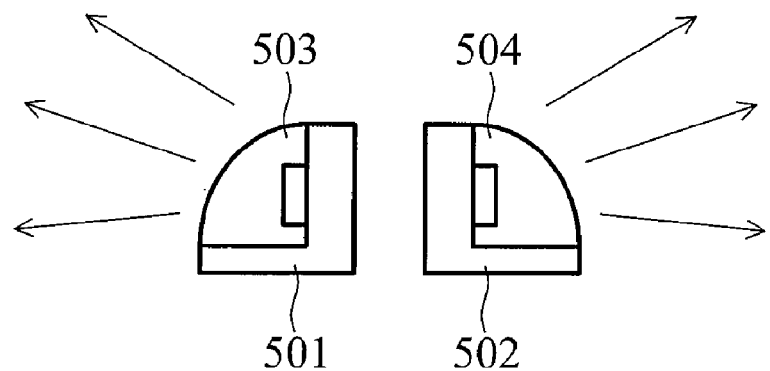
FIG. 5 shows another bounding frame of the invention.

FIG. 5 illustrates a bounding frame according to another embodiment of the invention. The first bounding frame 501 and the second bounding frame 502 respectively have emitting surfaces facing to different directions. The emitting surfaces can be curved or a polygon. The other two respective surfaces reflect light from the first light-emitting element 503 and the second light-emitting element 504 to the emitting surface of the LED backlight module.

Figure 6:
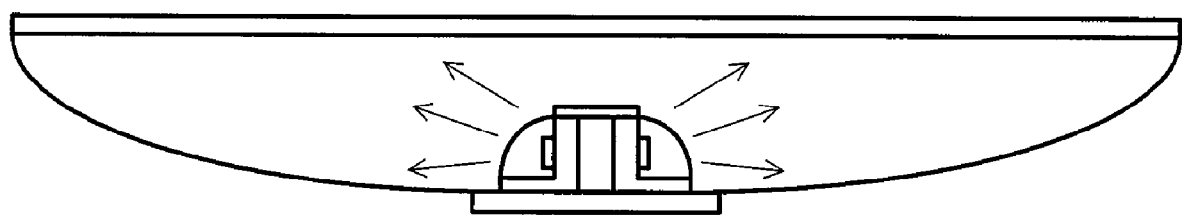
FIG. 6 shows a backlight module incorporated into the bounding frame of FIG. 5.
Figure 7:
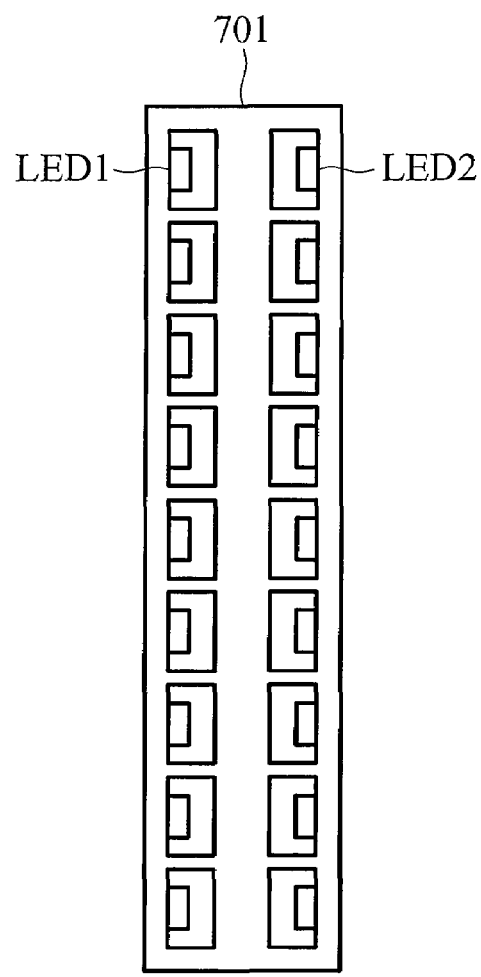
FIG. 7 is a top view of the light-emitting elements disposed on the printed circuit sheet.

FIG. 6 shows a backlight module incorporated into the bounding frame of FIG. 5. FIG. 7 is a top view of the light-emitting elements disposed on the printed circuit sheet. As shown, the emitting surfaces of light-emitting diodes LED1 and LED2 face to different directions. The color of light-emitting diode LED1 is different from that of light-emitting diode LED2, and is red, green, or blue.

Figure 8:
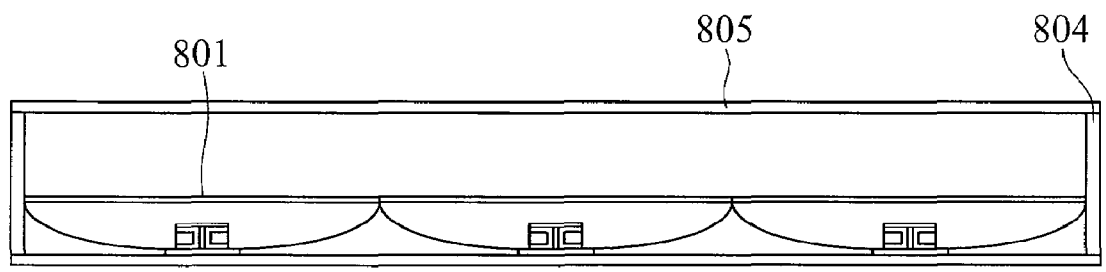
FIG. 8 shows a backlight unit of a liquid crystal panel.

FIG. 8 shows a backlight unit of a liquid crystal panel. The backlight unit comprises at least one backlight module 801, frame 804, and optical element 805. The backlight module 801 is disposed in frame 804, and the optical elements 805 are set on the top of the frame 804 to normalize white light emitted from the backlight module 801. The optical element 805 comprises a light guide plate and optical film, such as diffusion film, brightness enhancing film, or prism film.

Accordingly, the backlight unit using the backlight modules according to the invention solves the problem of color shift caused by varying brightness of light-emitting diodes. In addition, the backlight modules according to the invention comprise a plurality of light-emitting diodes, which resulting wider color mixed range. Thus, the amount of light-emitting diodes is decreased, reducing the cost of the panel.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A light emitting unit, comprising:
   a printed circuit sheet;
   a first bounding frame disposed on the printed circuit sheet, comprising a first blocking wall extended upward from the printed circuit sheet, a first base disposed on the printed circuit sheet and a first emitting surface directly contacting the first blocking wall and the first base and supported by the first blocking wall and the first base, wherein the first blocking wall comprises a first inner surface and a first outer surface opposite to the first inner surface, and wherein the first blocking wall and the first base of the first bounding frame are integrally formed as a single piece;
   a first light-emitting element disposed on the first inner surface;
   a second bounding frame disposed on the printed circuit sheet, comprising a second blocking wall extended upward from the printed circuit sheet, a second base disposed on the printed circuit sheet and a second emitting surface directly contacting the second blocking wall and the second base and supported by the second blocking wall and the second base, wherein the second blocking wall comprises a second inner surface and a second outer surface opposite to the second inner surface, and wherein the second blocking wall and the second base of the second bounding frame are integrally formed as a single piece; and
   a second light-emitting element disposed on the second inner surface;
   wherein the first outer surface and the second outer surface are disposed face to face.

2. The light emitting unit of claim 1, further comprising a first reflecting sheet disposed between the printed circuit sheet and the first and the second bounding frames.

3. The light emitting unit of claim 2, wherein the first reflecting sheet is wave-shaped or polygon-shaped.

4. The light emitting unit of claim 2, further comprising a second reflecting sheet directly disposed on the first bounding frame and the second bounding frame.

5. The light emitting unit of claim 2, further comprising a first optical element disposed above the first bounding frame and the second bounding frame, and supported by the first reflecting sheet.

6. The light emitting unit of claim 1, further comprising:
   a third bounding frame disposed on the printed circuit sheet, comprising a third blocking wall extended upward from the printed circuit sheet, wherein the third blocking wall comprises a third inner surface and a third outer surface opposite to the third inner surface;
   a third light-emitting element disposed on the third inner surface;
   a fourth bounding frame disposed on the printed circuit sheet, comprising a fourth blocking wall extended upward from the printed circuit sheet, wherein the fourth blocking wall comprises a fourth inner surface and a fourth outer surface opposite to the fourth inner surface; and
   a fourth light-emitting element disposed on the fourth inner surface;
   wherein the third outer surfaces and the fourth outer surface are disposed face to face, and wherein the first bounding frame and the third bounding frame are arranged in a first line, and the second bounding frame and the fourth bounding frame are arranged in a second line.

7. The light emitting unit of claim 6, wherein the first line is parallel to the second line.

8. A backlight module, comprising:
   a frame;
   two or more light emitting units disposed in the frame, wherein one of the light emitting unit comprises:
   a printed circuit sheet;
   a first bounding frame disposed on the printed circuit sheet, comprising a first blocking wall extended upward from the printed circuit sheet, a first top reflecting surface and a first bottom reflecting surface, wherein the first blocking wall connects to the first top reflecting surface and the first bottom reflecting surface and comprises a first inner surface and a first outer surface opposite to the first inner surface, and wherein the first blocking wall, the first top reflecting surface and the first bottom reflecting surface of the first bounding frame are integrally formed as a single piece;
   a first light-emitting element disposed on the first inner surface, wherein the first top reflecting surface is set above and covering the first light-emitting element;
   a second bounding frame disposed on the printed circuit sheet, comprising a second blocking wall extended upward from the printed circuit sheet, a second top reflecting surface and a second bottom reflecting surface, wherein the second blocking wall connects to the first top reflecting surface and the first bottom reflecting surface and comprises a second inner surface and a second outer surface opposite to the second inner surface, and the first outer surface and the second outer surface are disposed face to face, and wherein the second blocking wall, the second top reflecting surface and the second bottom reflecting surface of the second bounding frame are integrally formed as a single piece;
   a second light-emitting element disposed on the second inner surface, wherein the second top reflecting surface is set above and covering the second light-emitting element;
   a first reflecting sheet disposed between the printed circuit sheet and the first and the second bounding frames; and
   a second reflecting sheet directly disposed on the first bounding frame and the second bounding frame;
   a first optical element disposed above the first bounding frame and the second bounding frame, and supported by the first reflecting sheet; and a second optical element disposed above the first optical element and supported by the frame.

9. The backlight module of claim 8, wherein the first reflecting sheet is wave-shaped or polygon-shaped.

10. The backlight module of claim 8, wherein the light emitting unit further comprises:
   a third bounding frame disposed on the printed circuit sheet, comprising a third blocking wall extended upward from the printed circuit sheet, wherein the third blocking wall comprises a third inner surface and a third outer surface opposite to the third inner surface;
   a third light-emitting element disposed on the third inner surface;
   a fourth bounding frame disposed on the printed circuit sheet, comprising a fourth blocking wall extended upward from the printed circuit sheet, wherein the fourth blocking wall comprises a fourth inner surface and a fourth outer surface opposite to the fourth inner surface; and
   a fourth light-emitting element disposed on the fourth inner surface;
   wherein the third outer surfaces and the fourth outer surface are disposed face to face, and wherein the first bounding frame and the third bounding frame are arranged in a first line, and the second bounding frame and the fourth bounding frame are arranged in a second line.

11. The backlight module of claim 10, wherein the first line is parallel to the second line.

12. The light emitting unit of claim 1, wherein the first emitting surface and the second emitting surface are curved or polygon shaped.

13. The light emitting unit of claim 1, wherein the first base comprises a first bottom reflecting surface set under the first light-emitting element, and the second base comprises a second bottom reflecting surface set under the second light-emitting element.

14. The light emitting unit of claim 1, wherein the first bounding frame and the second bounding frame are L-shape.

15. The light emitting unit of claim 5, further comprising a second optical element disposed above the first optical element.

16. The backlight module of claim 8, wherein the first bounding frame and the second bounding frame are U-shape.

17. A light-emitting unit, comprising:
   a printed circuit sheet;
   a first bonding frame disposed on the printed circuit sheet, including:
      a bottom portion disposed on the printed circuit sheet; and
      a blocking wall connected with the bottom portion;
   a first light-emitting element disposed substantially in the first bonding frame, wherein the bottom portion is located between the first light-emitting element and the printed circuit sheet;
   a second bonding frame disposed on the printed circuit sheet, including:
   a bottom portion disposed on the printed circuit sheet; and
   a blocking wall connected with the bottom portion; and
   a second light-emitting element disposed substantially in the second bonding frame, wherein the blocking wall of the first bonding frame is between the first light-emitting element and the second light-emitting element.

18. The light emitting unit of claim 17, wherein the first bonding frame further includes a top portion connected with the blocking wall of the first bonding frame, and wherein the first light-emitting element is located between the top portion and the bottom portion of the first bonding frame.

19. The light emitting unit of claim 18, wherein the first bonding frame further includes two side portions, and each of the two side portion is connected with the bottom portion, the blocking wall and the bottom portion of the first bonding frame.

20. A light-emitting unit, comprising:
   a printed circuit sheet;
   a first bonding frame disposed on the printed circuit sheet, including:
      a bottom portion disposed on the printed circuit sheet; and
      a blocking wall connected with the bottom portion; and
   a first light-emitting element disposed substantially in the first bonding frame and located above the bottom portion.

21. A light-emitting unit, comprising:
   a printed circuit sheet;
   a plurality of first bonding frames disposed on the printed circuit sheet and arranged in a line, each of the plurality of first bonding frames including:
      a bottom portion disposed on the printed circuit sheet; and
      a blocking wall connected with the bottom portion; and
   a plurality of first light-emitting elements each disposed substantially in each of the first bonding frames, respectively.

* * * * *